United States Patent Office 3,437,918
Patented Apr. 8, 1969

3,437,918
INDUCTIVE BRIDGE CIRCUIT FOR FLAW SENSING IN WHICH ALL COILS OF THE BRIDGE ARE POSITIONED ADJACENT THE TEST PIECE
Anders Ingvar Arnelo, Vasteras, Sweden, assignor to Essem Metotest AB, Skultuna, Sweden
Filed Feb. 1, 1967, Ser. No. 613,146
Claims priority, application Sweden, Feb. 24, 1966, 2,432/66
Int. Cl. G01r 33/12
U.S. Cl. 324—37         2 Claims

ABSTRACT OF THE DISCLOSURE

An apparatus for use in the non-destructive testing of metals, which enables material of arbitrary shape and dimensions to be tested for flaws by stationary means and which indicates the positions where detected flaws are located in the material. Arrays of sensing coils, for eddy currents induced in the material, are arranged in the path of the material to be tested so that the entire width of the material is probed irrespective of the speed at which the material is advanced.

Background

Figure 1:
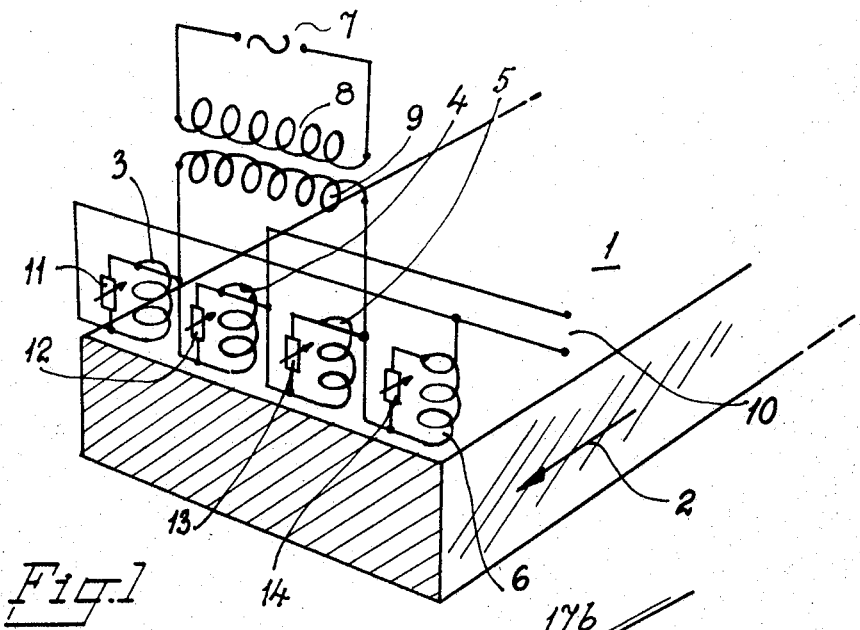

The present invention relates to an electroinductive sensing device having a plurality of sensing coils for eddy currents induced in the material to be tested, during movement of said material transversally to the axial direction of the coils.

It is previously known in the non-destructive testing of materials to utilize so called electroinductive testing. In this connection the sample material is lead past or through a coil arrangement connected to a source of alternating current. An electromagnetic field is generated in the coil and when the force lines of the field cut the test piece eddy currents appear in the same, which react on the coil arrangement and its electrical properties so that these vary as a function of the eddy currents in the sample material, the eddy currents in turn varying according to the different properties of the said sample material. By measuring the electrical data of the coil it is thus possible to check the properties of the said sample material. Since, however, the variations in the properties of the coil are in themselves very small the coil must be included in a bridge or compensation circuit of some arbitrary type and the unbalanced voltage obtained from the bridge must be greatly amplfied so that said variations can be recorded. Such bridge circuits are previously known per se and will not be described here in detail. A suitable embodiment of such bridge circuits is described, for instance, in the Swedish Patent 179,407 and on pages 92 and 93 in "Progress in Nondestructive Testing," by E. G. Stanford and J. H. Fearon, volume 1, Heywood and Company Limited, London, 1958. Electromagnetic testing of material is taken up in more detail in the section, "Electromagnetic Methods of Testing Metals" (pages 59–109), in the same book.

The magnitude and extension of the eddy currents are influenced by a large number of different factors, i.e., the coupling between coil and test sample which depends on the distance from the turns of the coil to the said sample material. Other factors are the shape of the sample, its conductivity and its magnetic properties. When testing material for flaws by means of the electroinductive method it is therefore important to eliminate the effects of all factors other than those which are connected with the faults in the material. For this purpose it is necessary, among other things, to adjust the coupling factors to the sample in question and the variables which are to be indicated. In the case of testing small dimensions, e.g., such material as rods and tubing, it is expedient to allow this material to pass through the coils but in the case of material in the form of rolled billets and moulding blanks, wider strips and plate it is not suitable to apply the through-passing method since coils used in the system would require unsuitable large dimensions whereby the influence exerted by the existing variables on the coil would be insufficient. To overcome this the method is applied whereby material is sensed by means of a so-called surface sensor capable of moving across the width of the material, i.e. transversely in relation to the direction in which the material is advanced. In the case of this method the relative speed between the coil and the material varies according to the existing position of the coil across the width of the material and thus it is necessary to arrange for complicated apparatus which are unsuitable in practice, to compensate this variation. Further, the speed of the coil must be sufficiently high to sense the material sensing being effected along a sinuous sensing method, at test speeds which can be defended economically. Furthermore, difficulties are met with when transferring the signals obtained from the coils during the sensing process to the aforementioned bridge or compensation circuit. It is, moreover, desirable when testing to mark the positions on the material where flaws occur. This is difficult to provide for in practice in conjunction with the method under discussion here.

It has also be suggested to arrange stationary sensing coils in rows across the width of the material. This method can only be applied in the case of thin material, a group of excitation coils (primary coils) being arranged on one side of the material and on the other side a series of individually operating sensing coils (secondary coils), so that a transformer action is obtained and the varying voltages originating from the sensing coils on variation of the intersecting properties of the sample material are fed to an amplifier and mutually compared. The method in question can only be applied to strip and sheet metal of small thickness and, furthermore, requires that access is found to both sides of the sample material at the same time.

The object of the invention is to eliminate the difficulties and limitations associated with the known methods and to enable material of arbitrary shape and dimensions to be tested by stationary means for flaws and to indicate the positions where detected flaws are located in the material.

An electroinductive sensing means according to the invention is mainly characterized in that the coils are positioned on one side of the material only, and in such a way that the extension of eddy currents substantially covers the specific testing area of the material.

Further characterizing features of the invention are evident from the claims.

Figure 2:
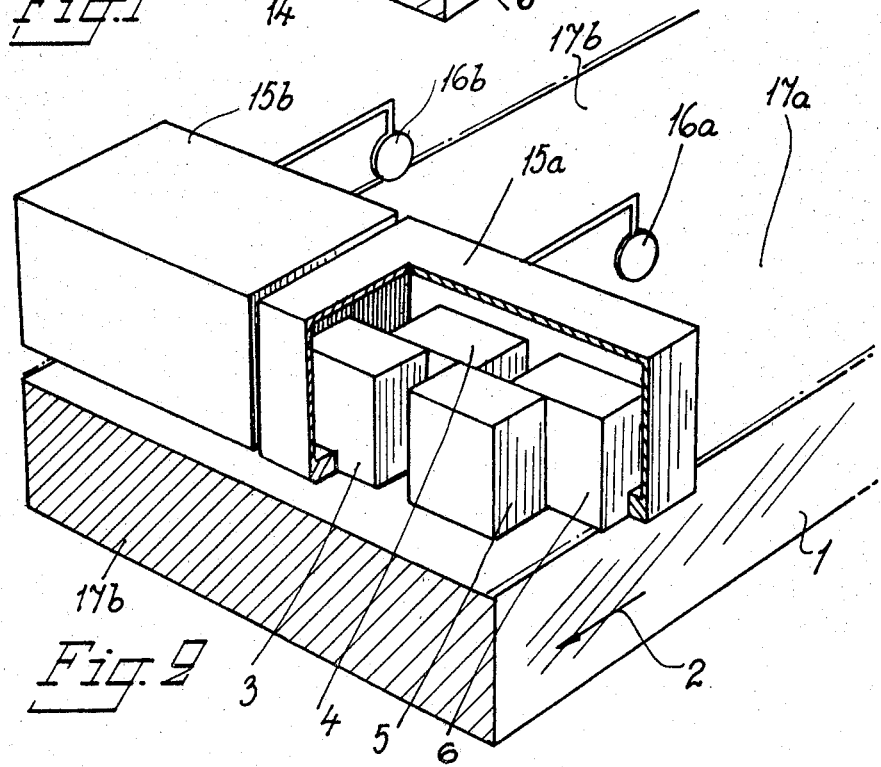

The invention will be more closely described with reference to the accompanying drawing where FIGURE 1 shows a sensor provided with a compensation or bridge circuit connected thereto and FIGURE 2 shows a sensor together with marking means.

Detailed description of invention

FIGURE 1 shows diagrammatically a path 1 for sample material, the path being movable, in the direction of the arrow, past a sensor which includes four coils 3, 4, 5 and 6. The coils are included in a bridge circuit which is supplied from an alternating current source 7, over a transformer having the primary winding 8 and the secondary winding 9. As can be seen from the figure each of the coils is arranged in a branch of the bridge and in addition to which the secondary winding 9 forms the one diagonal of the bridge and measuring signals taken out of the second diagonal of the bridge and over the terminals 10 are passed to a non-shown amplifying, indicating and marking means.

The bridge is so designed and compensated that when the properties of the material, of interest in the current case, are equal within the test area covered by each coil 3–6, a certain output balance current is obtained, i.e. the bridge is not zero balanced since a zero balanced bridge presents a number of disadvantages, such as varying sensitivity etc., depending on temperature and position. Each coil 3–6 is provided with a compensating means, as shown for instance in FIGURES 1, 11–14, for adjusting said outgoing balanced current.

FIGURE 2 shows two groups 15a, 15b of sensing coils, the casing for group 15a being partly cut-away. The coils 3 and 5 are arranged side by side and the coils 4 and 6 are disposed behind the coils 3 and 5 side by side but displaced in zig-zag fashion relative to the coils 3 and 5. The sample material 1, as before, moves in the direction of the arrow 2.

The groups 15a, 15b are arranged side by side and each senses a particular area of the width of the material 1 so that two separate sensing channels 17a, 17b are formed in the longitudinal direction of the material. Each group 15a, 15b is adapted to actuate, over non-shown means which include the said amplifyer, an associated indicating means 16a and 16b respectively in such a way that when the group in question senses a flaw in the surface of the material within said width area the marking means marks the position of the flaw, e.g., by colouring said position.

One advantage among the particular advantages obtained by the invention is that the sensing means are stationary and thus do not require driving means and moving mechanical parts, which are sensitive to disturbances in operation.

Further, the surface of the sensed material need not be cleaned and may also be hot without risk of the sensing means being damaged or giving erroneous measuring results.

Finally, an accurate sensing over the total area of the material is obtained, substantially independent of the speed at which the material is advanced, as well as an automatic marking of the positions where flaws occur within respective longitudinal channels.

The invention is not restricted to the described embodiments, which are intended for non-magnetic material, but may also be adapted to magnetic material providing that this is magnetized in a manner known per se.

What is claimed is:

1. An arrangement for non-destructive testing of elongated material, said arrangement comprising a plurality of electroinductive coils for sensing eddy currents induced in the material during relative movement in a direction transverse to the axial direction of the coils, electric bridge means connected to an external alternating current source and having branches each comprising one of said coils, each coil being a combined sender and receiver coil for impressing A.C. energy upon said material and being influenced by the properties of the material, whereby any variation in said properties causes an unbalance in said bridge means, and indicator means controlled by the bridge means to indicate such unbalance, said coils all being positioned on the same side of the material and disposed in a zig-zag arrangement to cover a continuous testing region along the width of the material.

2. An arrangement as claimed in claim 1 having several groups of coils, each group comprising a number of coils having a bridge means common thereto, said groups being arranged side by side to cover the whole width of the material to be tested and each group having a marking device to visually indicate faulty areas in said material.

References Cited

UNITED STATES PATENTS

| 3,100,281 | 8/1963 | Spanner | 324—40 |
| 3,241,058 | 3/1966 | Quittner | 324—40 |
| 3,247,453 | 4/1966 | Quittner | 324—37 |
| 3,271,662 | 9/1966 | Quittner | 324—40 |

FOREIGN PATENTS 846,312  8/1952  Germany.

RUDOLPH V. ROLINEC, *Primary Examiner.*

R. J. CORCORAN, *Assistant Examiner.*